UNITED STATES PATENT OFFICE.

JAMES S. MOTTER, OF MILWAUKEE, WISCONSIN, ASSIGNOR TO S. C. JOHNSON & SON, OF RACINE, WISCONSIN, A CORPORATION OF WISCONSIN.

WOOD-FILLER.

1,188,977.  Specification of Letters Patent.  Patented June 27, 1916.

No Drawing.  Application filed May 15, 1914.  Serial No. 838,714.

*To all whom it may concern:*

Be it known that I, JAMES S. MOTTER, a citizen of the United States, and resident of Milwaukee, in the county of Milwaukee and State of Wisconsin, have invented new and useful Improvements in Wood-Fillers, of which the following is a description.

I have discovered a new ingredient for use as a wood filler, which requires less oil than materials heretofore used for this purpose, and consequently requires less time for drying and leaves more solid matter so as to assure against shrinkage, and which remains in solution indefinitely without separating. This wood filler ingredient consists of a mineral which is mined in the northern peninsula of Michigan, in the county of Dickinson, near the city of Metropolitan. It is white in color, with a specific gravity of 2.66, weighing 22.15 pounds per gallon, and is crystalline in structure, though very soft and easily crushed or ground. Its settling point in 87% gasolene is 32 seconds, while its oil absorption to form a putty paste is one gallon of oil to 50.5 pounds of mineral. This mineral is now being marketed as, "Johnson's white mineral" or "metronite", and the following constitutes a chemical analysis thereof:

*Acid soluble portion.*

| | |
|---|---:|
| Iron and alumina, $Fe_2O_3$ and $Al_2O_3$ | 0.34% |
| Calcium carbonate, $CaCO_3$ | 46.30% |
| Magnesium carbonate, $MgCO_3$ | 35.19% |
| Insoluble portion, (silicates,) | 18.17% |
| | 100.00% |

*Analysis of insoluble portion.\**

| | |
|---|---:|
| Silica, $SiO_2$ | 10.56% |
| Calcium oxid, CaO | 3.68% |
| Magnesium oxid, MgO | 3.48% |
| Iron and alumina, $Fe_2O_3$ and $Al_2O_3$ | .45% |
| | 18.17% |

\* Existing as a double silicate of calcium and magnesium. As in tremolite asbestos.

The oil absorption of this mineral, under which it only requires three gallons of raw linseed oil to 100 pounds of the mineral as compared with 5½ gallons of oil for the same quantity of hard or soft silica to reach the proper consistency for a wood filler, assures a comparatively quick drying action for the new mineral ingredient with a correspondingly better filling effect, since the filler with less oil contains a greater quantity of solid matter. This low percentage of oil furthermore assures against shrinkage of the filler. Unlike various other mineral ingredients of wood fillers the present mineral has the property of remaining in solution indefinitely without separation, and though it is of a crystalline structure it is soft and easily crushed and ground. The wood filler with this mineral is produced by the addition of oil and driers as usual.

What I claim as new and desire to secure by Letters Patent is:

1. A wood filler containing a vehicle and a mineral ingredient having substantially the composition of calcium carbonate 46% and magnesium carbonate 35%.

2. A wood filler containing a vehicle and a mineral ingredient consisting of a white, crystalline mineral having a specific gravity of approximately 2.66 and a weight of approximately 22.15 pounds per gallon and an oil absorption for putty paste of approximately one gallon of oil to 50.5 pounds of mineral and containing calcium carbonate substantially 46% and magnesium carbonate substantially 35%.

3. A wood filler containing a vehicle and a mineral ingredient analyzing the following compounds in substantially the proportions given:

| | |
|---|---:|
| Iron and alumina, $Fe_2O_3$ and $Al_2O_3$ | 0.34% |
| Calcium carbonate, $CaCO_3$ | 46.30% |
| Magnesium carbonate, $MgCO_3$ | 35.19% |
| Insoluble portion, (silicates,) | 18.17% |
| | 100.00% |

In testimony whereof, I affix my signature, in presence of two witnesses.

JAMES S. MOTTER.

Witnesses:
H. W. HOUGHTON,
REINH. R. BRENTZMANN.

Copies of this patent may be obtained for five cents each, by addressing the "Commissioner of Patents, Washington, D. C."